United States Patent
Hegedüs

Patent Number: 5,974,125
Date of Patent: *Oct. 26, 1999

[54] TELEPHONE EXCHANGE WITH A FURTHER UNIT

[75] Inventor: Arpad Hegedüs, Vienna, Austria

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/957,402

[22] Filed: Oct. 23, 1997

Related U.S. Application Data

[63] Continuation of application No. 08/540,906, Oct. 11, 1995, which is a continuation-in-part of application No. 08/450,788, May 26, 1995, abandoned.

[30] Foreign Application Priority Data

Jun. 1, 1994 [AT] Austria .................................... 1119/94

[51] Int. Cl.⁶ .................................................. H04M 15/00
[52] U.S. Cl. ............................. 379/127; 379/67; 379/68; 379/88
[58] Field of Search .................................. 379/67, 88–89, 379/127, 211, 14–18, 31, 120

[56] References Cited

U.S. PATENT DOCUMENTS

| | | | |
|---|---|---|---|
| 4,068,101 | 1/1978 | Chemarin | 179/18 |
| 4,580,012 | 4/1986 | Matthews | 379/89 |
| 4,580,016 | 4/1986 | Williamson | 379/31 |
| 4,998,272 | 3/1991 | Hawkins, Jr. et al. | 379/88 |
| 5,222,120 | 6/1993 | McLeod | 379/88 |
| 5,268,957 | 12/1993 | Albrecht | 379/67 |
| 5,375,161 | 12/1994 | Fuller | 379/211 |
| 5,400,393 | 3/1995 | Knuth et al. | 379/88 |
| 5,475,737 | 12/1995 | Garner et al. | 379/211 |
| 5,555,292 | 9/1996 | Eckhart | 379/67 |
| 5,712,902 | 1/1998 | Florence et al. | 379/89 |

FOREIGN PATENT DOCUMENTS

| | | |
|---|---|---|
| 0087849 | 9/1983 | European Pat. Off. . |
| 0304653 | 3/1989 | European Pat. Off. . |
| 0336524 | 10/1989 | European Pat. Off. . |

*Primary Examiner*—Curtis A. Kuntz
*Assistant Examiner*—Duc Nguyen
*Attorney, Agent, or Firm*—Ware, Fressola, Van Der Sluys & Adolphson LLP

[57] ABSTRACT

Telephone exchange with associated voice mail device is connected to a calling subscriber after a predetermined time if the called subscriber does not answer the call, as well as method to store such voice messages in such a device, whereby the voice mail device is able to store voice messages arriving from the calling subscriber and intended for the called subscriber and to send them to the called subscriber on his request. The telephone exchange comprises means which will also connect all further calls for the called subscriber to the voice mail device as soon as one switchover after timeout of the called subscriber to the voice mail device has been executed. Hence, the exchange recognizes that the called subscriber is not ready to speak and switches all further arriving calls to the voice mail device.

12 Claims, 4 Drawing Sheets

TELEPHONE EXCHANGE WITH A FURTHER UNIT

This application is a continuation of application Ser. No. 08/540,906 filed on Oct. 11, 1995 which is itself a continuation-in-part of U.S. Ser. No. 08/450,788 filed May 26, 1995, now abandoned.

TECHNICAL FIELD

The invention concerns a telephone exchange installation having a so-called voice mail capability provided by speech storage equipment usually called a voice mail device which, during a call made by a calling subscriber, connects with the latter after a predetermined time if the called subscriber does not lift the receiver of his telephone or otherwise answer the call, wherein the telephone exchange includes a device for transferring a call to a selected mailbox in the voice mail device which is able to store incoming voice messages from calling subscribers and send them to the called subscriber upon his request and further concerns a method for storing voice messages in such voice mail device, wherein the voice mail device is able to store voice messages received from the calling subscriber and intended for the called subscriber, and to send them to the called subscriber upon his request.

BACKGROUND OF THE INVENTION

Telephone exchanges with speech storage equipment are already known and are mostly called voice-mail equipment in the profession. Such voice mail devices are very explicitly described by EP 0,087,849 and EP 0,336,524, for example. A method and a device for storing telephone messages in a private telephone branch exchange are also known from EP 0,304,653.

The task of these devices is for called subscribers, who cannot be reached at the moment, to initiate a fixed call transfer to the voice mail device, or for the device to initiate a call transfer after a predetermined waiting time, if the called subscriber does not answer the call.

If a call is transferred to the voice mail device and it answers the call, the telephone set signals the number of the called subscriber by means of Dual Tone Multiple Frequency (DTMF) signals, which automatically connect the calling subscriber with the personal mailbox of the called subscriber and allows him to record his voice message.

Exchange installations with call transfer have been known for a long time. All the devices in these installations are reset to their starting condition after the voice connection is terminated. As mentioned, if the called subscriber has not activated a call transfer to the voice mail device, the call transfer of a new call is only activated after a predetermined time has passed.

The known devices have the disadvantage that if the subscriber is not ready to answer, each new call first reaches the subscriber station and is only connected with the voice mail device if the receiver of the called subscriber's telephone set has not been lifted or answered within the predetermined waiting time. This is considered to be disturbing to other persons who are present in the room at that time. In addition, the time span before the call is connected passes without being used by the calling subscriber, i.e., in a wasteful manner.

DISCLOSURE OF INVENTION

It is the task of the present invention to eliminate this disadvantage, particularly to keep the waiting time as short as possible before access to the voice mail device is obtained.

The invention fulfills this task in that a control device contains means which immediately connects all further calls intended for the called subscriber to the voice mail device after the called subscriber has been switched once to the voice mail device in a time-dependent manner. The control device, which may be associated with the exchange installation, thus recognizes that the called subscriber is not ready to answer the call and switches all further incoming calls to the voice mail device.

Another development of the invention provides for the control device to again connect all further incoming calls intended for the called subscriber to the called subscriber's telephone set after an activation process has taken place in the called subscriber's telephone set, for example by lifting the receiver.

Another configuration of the invention provides for the control device to again connect all further incoming calls intended for the called subscriber to the called subscriber's telephone set only after the called subscriber makes an inquiry request. This measure also prevents a switch-over to the called subscriber from taking place when his subscriber telephone set is being used by a third person, or if the called subscriber wants to make outgoing calls, but does not want to answer incoming calls.

Unlike the state of the art, which causes subsequent calling subscribers who call after a first calling subscriber is switched to the voice mail device after a predetermined time, to also wait for the predetermined time to expire, thereby wasting the time of such subsequent calling subscribers, not to mention disturbing the persons who may be in the room, the present invention recognizes that the called subscriber still does not want to receive incoming calls. It therefore switches the subsequent calls directly to the voice mail device and does not bother any other persons who happen to be in the room with annoying ringing and does not make such subsequent calling subscribers wait unduly before being switched to the voice mail device. Moreover, it provides a simple way for the called subscriber to reactivate incoming calls so that he may answer them directly. This may take the form of a simple removal of the receiver from the telephone set or having the called subscriber make a selected inquiry request so that he alone may reactivate his phone and/or only when he wishes.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
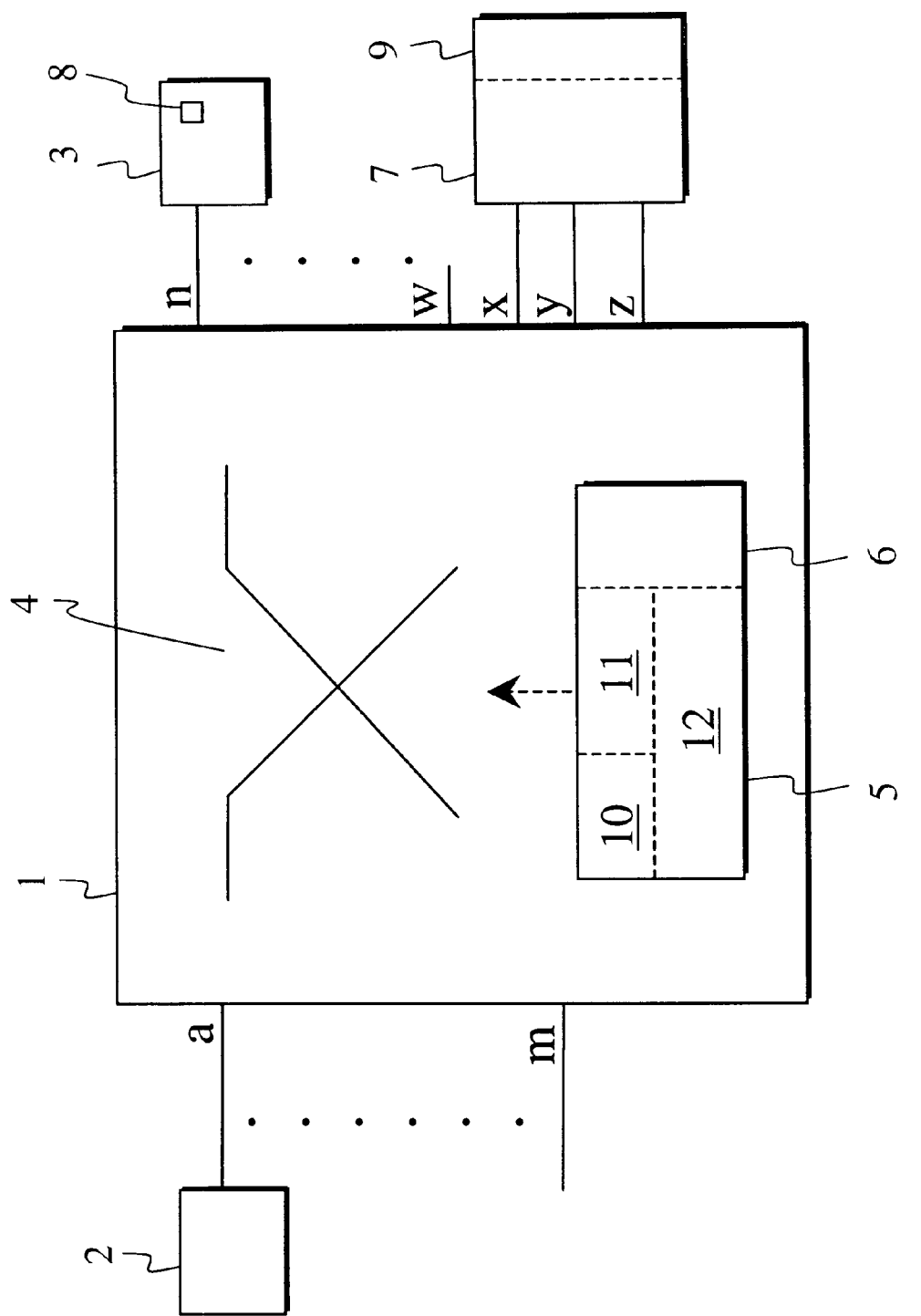
FIG. 1 shows a telephone exchange connected or connectable to both a plurality of telephone sets and a voicemail device adapted, according to the invention, to remain activated for a called subscriber after a first calling subscriber is routed thereto until the called subscriber is ready to receive messages or to talk.

Subscriber terminals are connected to a telephone exchange installation 1 through ports a–z. In the present example, ports a–w are provided for the connection of subscriber telephone sets 2, 3, and a further unit such as voice-mail device 7 is connected to ports x, y and z.

The exchange installation 1 contains a switching matrix 4 whereby the terminals 2, 3, 7 are interconnected in the known manner, and which is controlled by a first control process 10 in a control device 5. The first control process 10 may be carried out by a set of prestored instructions in a computer program as described below in detail.

A calling subscriber using a calling subscriber set 2 calls a called subscriber at a called subscriber set 3, for example, thus starting the first control process 10 in the control device 5, which is available to control this call only and there is therefore always one control process carried out according to the first control process 10 per call which is able to perform a call transfer after some time has passed. The control device 5 also contains a second control process 11, which performs an immediate call transfer when a transfer key is activated on subscriber set 3. A third control process 12 assigns either the first control process 10 or the second control process 11 to the subscriber set 3 in accordance with the criteria described below.

Therefore, if a subscriber using the subscriber set 3 is not ready to answer the call at the time it arrives, and if he has not activated the call transfer key, the call is routed by first control process 10 to the voice mail device 7, after a predetermined calling time has expired.

If the call from subscriber set 2 has now been routed to the voice mail device 7, a port is found open and the voice mail device 7 answers, the number of subscriber set 3 is sent by means of DTMF signals to the voice mail device 7 through a DTMF register 6, which is engaged, accessed or otherwise controlled by the first control process 10. Subscriber set 2 is then connected with the personal mailbox 9 of the called subscriber at subscriber set 3 in the voice mail device and a calling subscriber using subscriber set 2 is now able to record voice messages in the personal mailbox 9 of the called subscriber at subscriber set 3. As a rule, this process ends when the calling subscriber using set 2 hangs up, or after a predetermined recording time has expired. An LED or a display on the subscriber set 3 can be used to indicate that messages are waiting in the voice mail device 7.

Immediately after the number of subscriber set 3 has been sent to the voice mail device 7, the first control process 10 clears the DTMF register 6 once again.

After the call from the calling subscriber set 2 to the voice-mail device 7 of called subscriber 3 has ended, according to the present invention, the third control process 12 then reprograms the time-dependent transfer of subscriber set 3 to the voice mail device 7 into an immediate transfer so that, when a subscriber next calls subscriber set 3, the second control process 11 begins and performs the immediate transfer to the voice mail device. This program adjustment remains active, and each further incoming call is automatically relayed to the voice mail device until the receiver of subscriber set 3 is lifted, indicating that the subscriber using subscriber set 3 is once again ready to answer. Now control process 10 again changes the permanent transfer into a time-lapse transfer under the control of the first control process 10. According to a preferred configuration of this invention, this can also take place after an inquiry request by the called subscriber using subscriber set 3. This prevents a third person utilizing subscriber set 3 from causing a deactivation without authorization.

It should be pointed out that the above description of FIG. 1 only depicts a configuration example of the invention, wherein control processes 10, 11 and 12 are illustrated as separate processes for better understanding. In practice, these control processes will normally be integrated into a single process, which performs the first time-dependent call transfer and then transfers all other calls immediately.

Figure 2A:
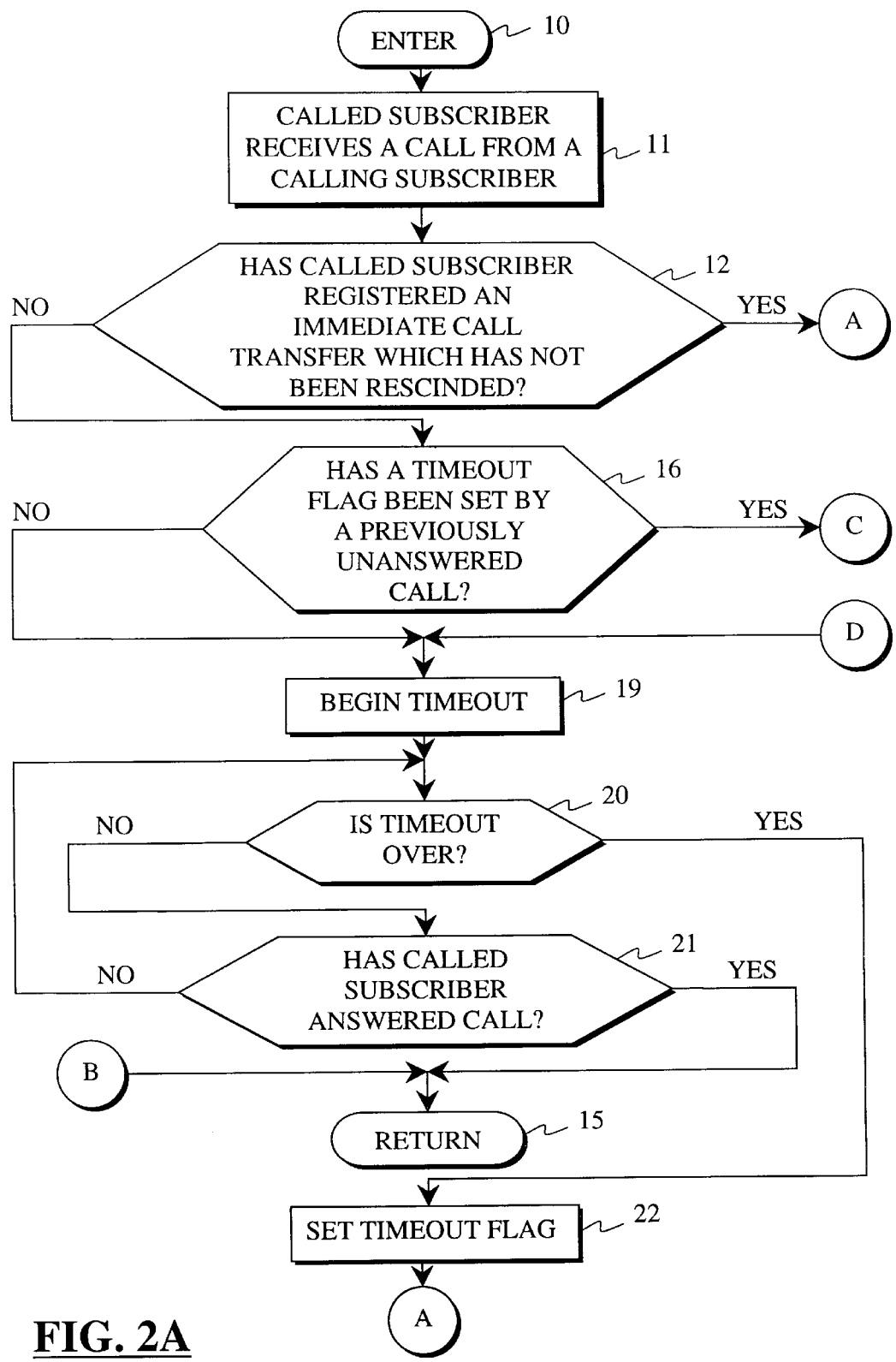
FIGS. 2A, 2B and 2C together show a series of steps which may be carried out, according to the invention, in conjunction with the equipment of FIG. 1.
Figure 3:
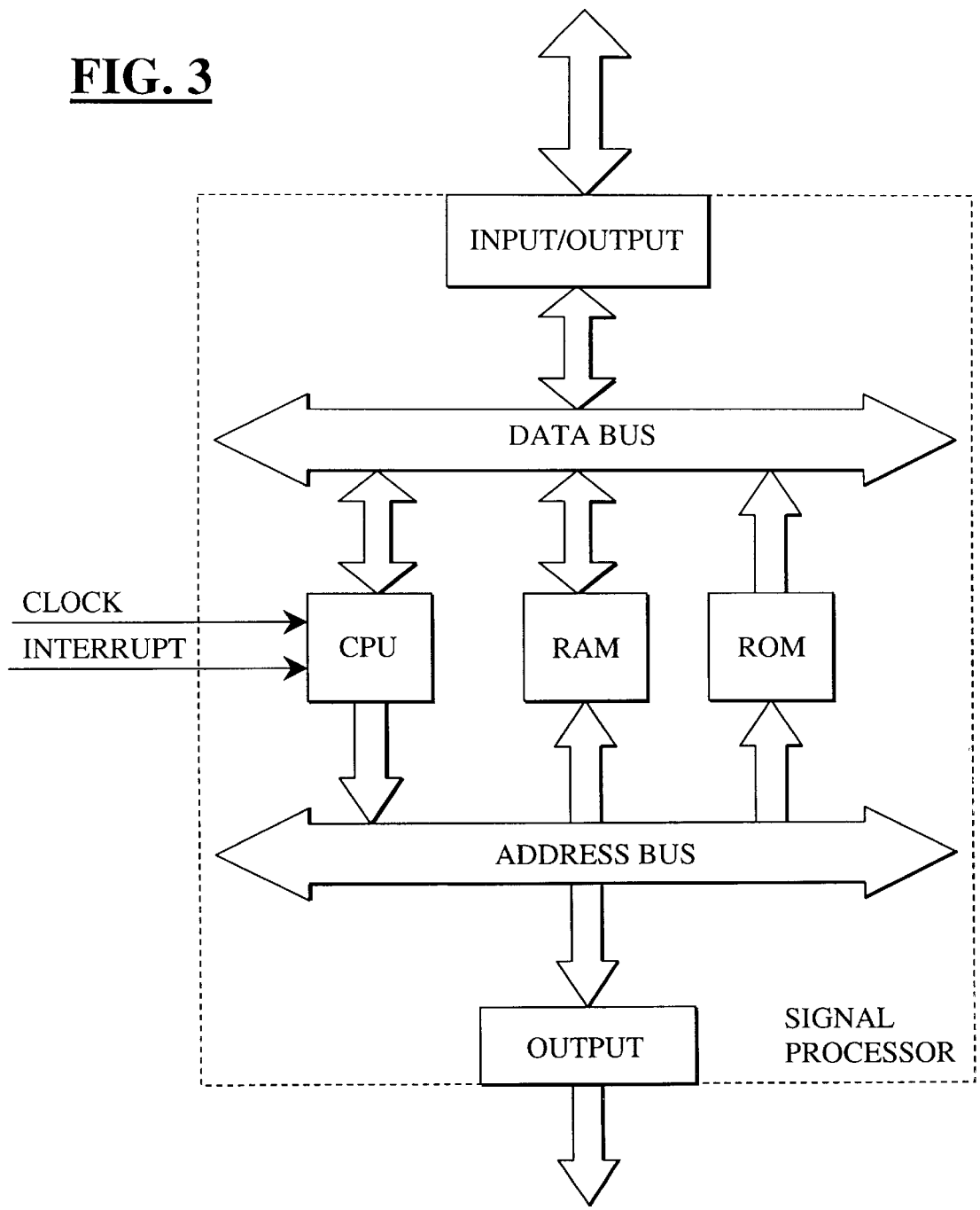
FIG. 3 shows a signal processor which may be used to carry out the processes of the control device of FIG. 1 according to a set of programmed instructions for carrying out the series of steps illustrated in FIGS. 2A, 2B and 2C.

For instance, referring now to FIG. 2A, the control device 5 of FIG. 1 may include a stored series of programmed steps for carrying out the above-described functions. This may be done using a signal processor such as shown in FIG. 3 including a central processing unit (CPU) in conjunction with a random access memory (RAM), a read only memory (ROM), a clock, various data, control and address buses, input/output devices and other well known components in the art of signal processing.

After entering in a step 10, a step 11 may be executed wherein it is recognized that a called subscriber set 3 receives a call from a calling subscriber set 2. A decision step 12 may then be executed to determine if a user of the called subscriber set 3 has previously initiated an immediate call transfer, e.g., by means of the above-described transfer key. If so, an immediate transfer of the call to the voice mail device 7 is carried out by the device 5 of FIG. 1, as indicated in a step 13 in FIG. 2B. A step 14 next determines whether the voice message from the calling subscriber set 2 is finished recording and if not, it waits until it is finished. After finishing, a return is made in a step 15 as shown in FIG. 2A.

Figure 2B:
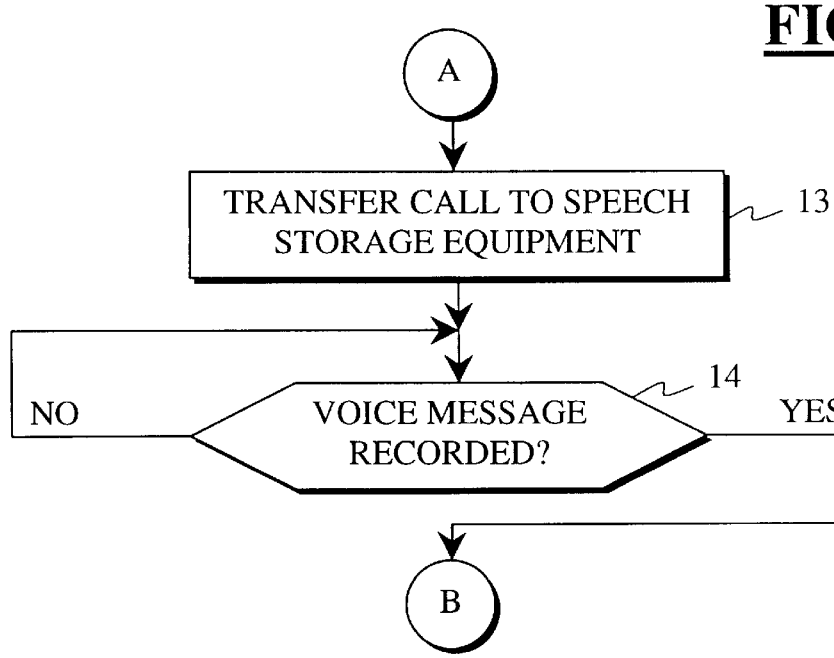
Figure 2C:
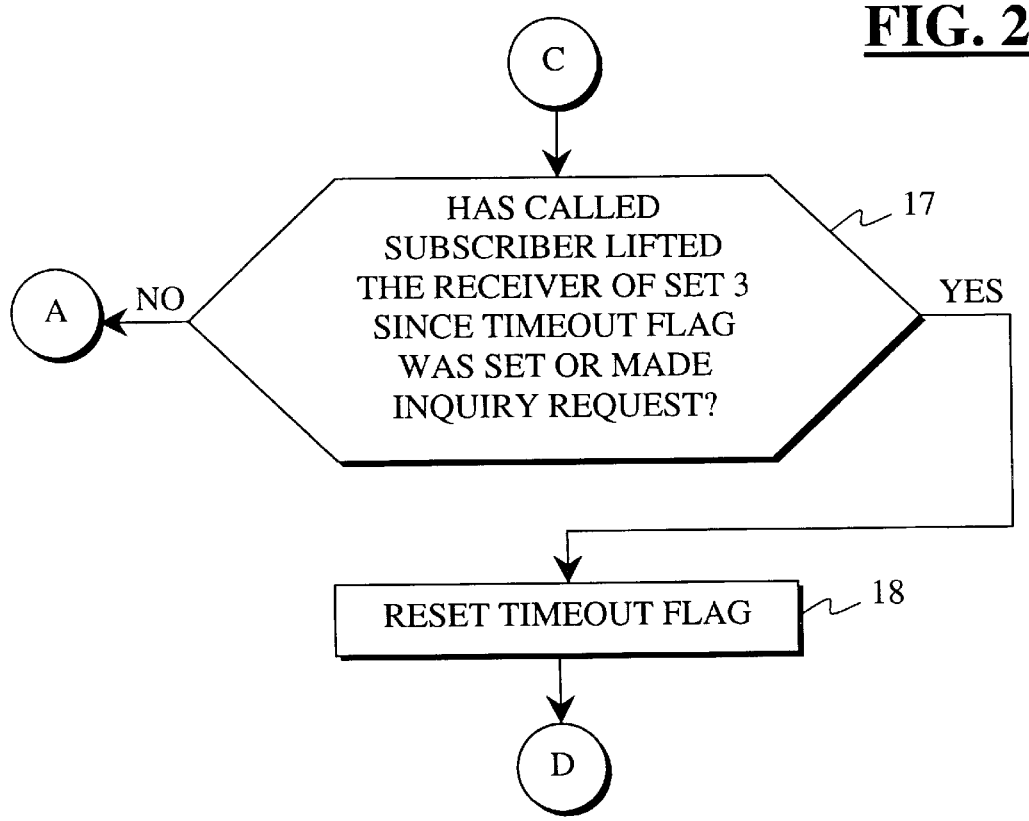

If it is determined in the step 12 that the user at called subscriber set 3 has not initiated an immediate call transfer, a step 16 is executed to determine if a timeout flag has been set by a previously unanswered call at the called subscriber set 3. If so, a step 17 is next executed, as illustrated in FIG. 2C, to determine if a user at the called subscriber set 3 has answered a call since the timeout flag was set or has made an inquiry request since then (requesting deactivation of automatic transfer). If not, the steps of FIG. 2B are executed, as previously described and a return made, as before. If it is determined in step 17 that the called subscriber has answered a call since the timeout flag was last set or has made an inquiry request since then, the timeout flag is reset, as indicated in a step 18.

After the timeout flag is reset in step 18 or if it were determined in step 16 that the timeout flag had not previously been set by an unanswered call at subscriber set 3, a step 19 is then executed to begin a timeout count as indicated in FIG. 2A. A step 20 then checks to see if the timeout is over before a user at subscriber set 3 has answered a call as indicated in a decision step 21. If a user at subscriber set 3 answers the call before the timeout is over, a return is made in the step 15. If, on the other hand, the timeout is over before anyone picks up the receiver at subscriber set 3 then a step 22 is executed in which the timeout flag is set. After that, the steps of FIG. 2B are executed, as described previously, for transferring the call to the voice mail device and recording the voice message of the user of subscriber set 2 for later retrieval from the voice mail device 7 by a user of the subscriber set 3.

It should be realized that the steps shown in FIGS. 2A, 2B and 2C are but one example of a set of such steps which may be used in carrying out the present invention. Many other variations are, of course, possible. Even within the set of steps shown in FIGS. 2A–2C, it is possible to make many variations. For instance, the steps 12 and 16 can be condensed into a single step in which it is determined whether an immediate call transfer has been registered by the called subscriber or by a previously-unanswered call. In that case, the reset timeout flag described above can be dispensed with and the registration of an immediate call transfer can be indicated by a different instrumentality, such as an immediate call transfer flag, which is independently controlled and simply checked by the program of FIGS. 2A–2C. Therefore, it will be understood by those of skill in the art that the program steps shown in FIGS. 2A–2C merely represent one way of carrying out the teachings hereof.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Telephone exchange (1) including a control device (5) for connecting a first port (a) coupled to a first subscriber set (2) to a second port (n) coupled to a second subscriber set (3) in response to a call originating from said first subscriber set (2) and destined for said second subscriber set (3), which control device comprises control process means (12) for, when activated by a request registered by the second subscriber for an immediate call transfer or by a previously unanswered call to said second subscriber which is still in effect, connecting said first port (a) to a third port (x) being different from said second port (n) for transferring said call destined for said second subscriber set (3) to a further unit (7) coupled to said third port (x) and being different from said second subscriber set (3), and for, when deactivated, connecting said first port (a) to said second port (n) for transferring said call destined for said second subscriber set (3) to said second subscriber set (3), wherein said control process means (12) are deactivated in response to a receiver of said second subscriber set (3) being lifted, after which subsequent calls destined for said second subscriber set (3) are connected to said second port (n) until said control device is activated again.

2. Telephone exchange (1) as claimed in claim 1, wherein said control device (5) comprises a first control process (10) for transferring said call destined for said second subscriber set (3) to said further unit (7), when said receiver of said second subscriber set (3) has not been lifted after a predetermined time.

3. Telephone exchange (1) as claimed in claim 2, wherein said control device (5) further comprises a second control process (11) for transferring said call destined for said second subscriber set (3) to said further unit (7) immediately and independently from said predetermined time.

4. Telephone exchange (1) as claimed in claim 1, wherein said further unit (7) comprises a voice mail device.

5. Telephone exchange (1) as claimed in claim 1, wherein said further unit (7) comprises a voice mail device.

6. Telephone exchange (1) as claimed in claim 3, wherein said further unit (7) comprises a voice mail device.

7. Method for making connections in a telephone exchange (1) including a control device (5) whereby a first port (1) coupled to a first subscriber set (2) is connected to a second port (n) coupled to a second subscriber set (3) in response to a call originating from said first subscriber set (2) and destined for said second subscriber set (3), which control device comprises control process means (12) whereby, when activated by a request registered by the second subscriber for an immediate call transfer or by a previously unanswered call to said second subscriber which is still in effect, said first port (a) is connected to a third port (x) being different from said second port (n) for transferring said call destined for said second subscriber set (3) to a further unit (7) coupled to said third port (x) and being different from said second subscriber set (3), and whereby, when deactivated, said first port (a) is connected to said second port (n) for transferring said call destined for said second subscriber set (3) to said second subscriber set (3), wherein said control process means (12) are deactivated in response to a receiver of said second subscriber set (3) being lifted, after which subsequent calls destined for said second subscriber set (3) are connected to said second sort (n) until said control device is activated again.

8. Method as claimed in claim 7, wherein said control device (5) comprises a first control process (10) for transferring said call destined for said second subscriber set (3) to said further unit (7), when said receiver of said second subscriber set (3) has not been lifted after a predetermined time.

9. Method as claimed in claim 8, wherein said control device (5) further comprises a second control process (11) for transferring said call destined for said second subscriber set (3) to said further unit (7) immediately and independently from said predetermined time.

10. Method as claimed in claim 7, wherein said further unit (7) comprises a voice mail device.

11. Method as claimed in claim 8, wherein said further unit (7) comprises a voice mail device.

12. Method as claimed in claim 9, wherein said further unit (7) comprises a voice mail device.

* * * * *

UNITED STATES PATENT AND TRADEMARK OFFICE
CERTIFICATE OF CORRECTION

PATENT NO : 5,974,125
DATED : October 26, 1999
INVENTOR(S): Arpad Hegedüs

It is certified that error appears in the above-identified patent and that said Letters Patent is hereby corrected as shown below:

At column 6, line 3 (claim 5, line 1), "claim 1" should be --claim 2--.

At column 6, line 28 (claim 7, line 22), "sort" should be --port--.

Signed and Sealed this

Eighth Day of August, 2000

Q. TODD DICKINSON

Attest:

Attesting Officer

Director of Patents and Trademarks